(12) United States Patent
Schneider-Nieskens

(10) Patent No.: US 6,627,306 B2
(45) Date of Patent: Sep. 30, 2003

(54) SOFT ELASTIC CUSHION

(75) Inventor: Reinhold Schneider-Nieskens, Burgwedel (DE)

(73) Assignee: Thämert Orthopädische Hilfsmittel GmbH & Co. KG, Burgwedel (DE)

(*) Notice: Subject to any disclaimer, the term of this patent is extended or adjusted under 35 U.S.C. 154(b) by 57 days.

(21) Appl. No.: 09/861,249

(22) Filed: May 18, 2001

(65) Prior Publication Data

US 2001/0042270 A1 Nov. 22, 2001

(30) Foreign Application Priority Data

May 19, 2000 (DE) ......................... 100 24 832

(51) Int. Cl.⁷ ................................ B32B 5/14
(52) U.S. Cl. ................ 428/308.4; 428/71; 428/72; 428/317.1; 428/423.1; 428/423.4; 428/423.5; 428/423.7; 428/424.4; 428/425.5; 428/425.1; 428/447; 428/452
(58) Field of Search ............... 428/71, 72, 308.4, 428/317.1, 423.1, 423.4, 423.5, 423.7, 424.4, 425.5, 425.1, 447, 452

(56) References Cited

U.S. PATENT DOCUMENTS

| | | | | |
|---|---|---|---|---|
| 4,378,396 A | * | 3/1983 | Urai et al. | 297/219.1 |
| 5,334,442 A | * | 8/1994 | Okamoto et al. | 428/314.4 |
| 5,460,873 A | * | 10/1995 | Ogawa et al. | 296/97.1 |
| 5,512,361 A | * | 4/1996 | Takeuchi et al. | 428/318.8 |
| 6,020,055 A | * | 2/2000 | Pearce | 106/122 |

FOREIGN PATENT DOCUMENTS

| | | | |
|---|---|---|---|
| DE | 196 40 263 | 4/1998 | |
| JP | 05-269031 | * 10/1993 | A47C/27/22 |

* cited by examiner

Primary Examiner—James J. Seidleck
Assistant Examiner—Melanie Bissett
(74) Attorney, Agent, or Firm—Collard & Roe, P.C.

(57) ABSTRACT

A soft elastic cushion for use in conjunction with an orthopedic aid has a textile composite comprising at least two layers arranged on the soft elastic cushion. It is possible in this way to secure a textile cover on a soft elastic substrate such as silicone.

3 Claims, 1 Drawing Sheet

SOFT ELASTIC CUSHION

BACKGROUND OF THE INVENTION

1. Field of the Invention

The invention relates to a soft elastic cushion for use in conjunction with an orthopedic aid such as an insert.

2. The Prior Art

It is desirable to provide such a soft elastic insert, which generally consists of silicone, but may be made of other comparable materials as well, with a textile cover because the textile covering is more pleasant on the skin than silicone. Furthermore, it is substantially easier for parts of the body resting against such a cover to slide on or be displaced than along a silicone surface. Especially in conjunction with inserts for feet, such a textile covering is advantageous in that the foot can then slide into the shoe on the textile insert.

However, it has been found to be very difficult to glue or laminate such a layer to silicone. It is also very difficult to bond a textile layer to the still-liquid silicone because the textile material becomes completely penetrated by the silicone, and no clean textile cover can be produced.

SUMMARY OF THE INVENTION

It is therefore an object of the invention to provide a soft-elastic cushion for use in conjunction with an orthopedic aid having a textile covering.

According to the basic idea of the invention, a textile composite comprising at least two layers is arranged on the soft-elastic cushion. This makes it possible to provide one layer specifically for the adhesion to or connection with the soft-elastic cushion. A clean outer textile layer remains preserved in this way.

The textile composite preferably has a textile cover material, which is in contact with the human body, and which is therefore arranged on the side of the textile composite facing away from the soft-elastic cushion. This layer is joined with the soft-elastic cushion by the textile composite. Furthermore, the textile composite preferably has a foil to which the cover textile material is bonded. Such a textile composite can be simply inserted in a tool for manufacturing the soft-elastic cushion and injected from behind. In this production process, the foil prevents the material used for producing the soft elastic cushion, which is usually silicone, from penetrating the textile cover material. For producing the adhesion of the foil directly to the silicone, the tool should be heated to at least 120° to 150° C. The foil is preferably formed by a polyurethane sheet because the handling of such a sheet is particularly simple and the textile cover can be bonded to the polyurethane sheet in a simple manner as well. Furthermore, the polyurethane sheet assures safe screening against the silicone.

According to a preferred further development of the invention, the textile composite comprises a second textile fabric for making the connection with the soft-elastic cushion. This second textile fabric may be a particularly simple textile fabric or also a knitted material, which is comparatively coarse-meshed and permits the material for producing the soft-elastic cushion to penetrate in a particularly positive way. The soft-elastic cushion is preferably formed from silicone and/or a multi-component PU elastomer because the latter can be processed in a particularly simple manner.

In a preferred embodiment of the invention, the textile composite consists of a foil that is laminated on both sides. The textile cover material is arranged on one side and the second textile fabric on the other. It is favorable if the textile composite comprises three layers. It is also entirely possible to provide additional layers especially if this leads to special benefits when the individual layers are joined. Furthermore, it is also conceivable to substitute for the sheet a comparatively impermeable textile fabric, so that there is a textile cover, then an intermediate layer that is impermeable to the silicone, for example an intermediate layer of textile material, and a second textile fabric for joining the textile composite with the cushion.

BRIEF DESCRIPTION OF THE DRAWINGS

Other objects and features of the present invention will become apparent from the following detailed description considered in connection with the accompanying drawing. It is to be understood, however, that the drawing is designed as an illustration only and not as a definition of the limits of the invention.

The FIGURE shows a schematic sectional view of a cushion as defined by the invention.

DETAILED DESCRIPTION OF THE PREFERRED EMBODIMENT

Figure 1:
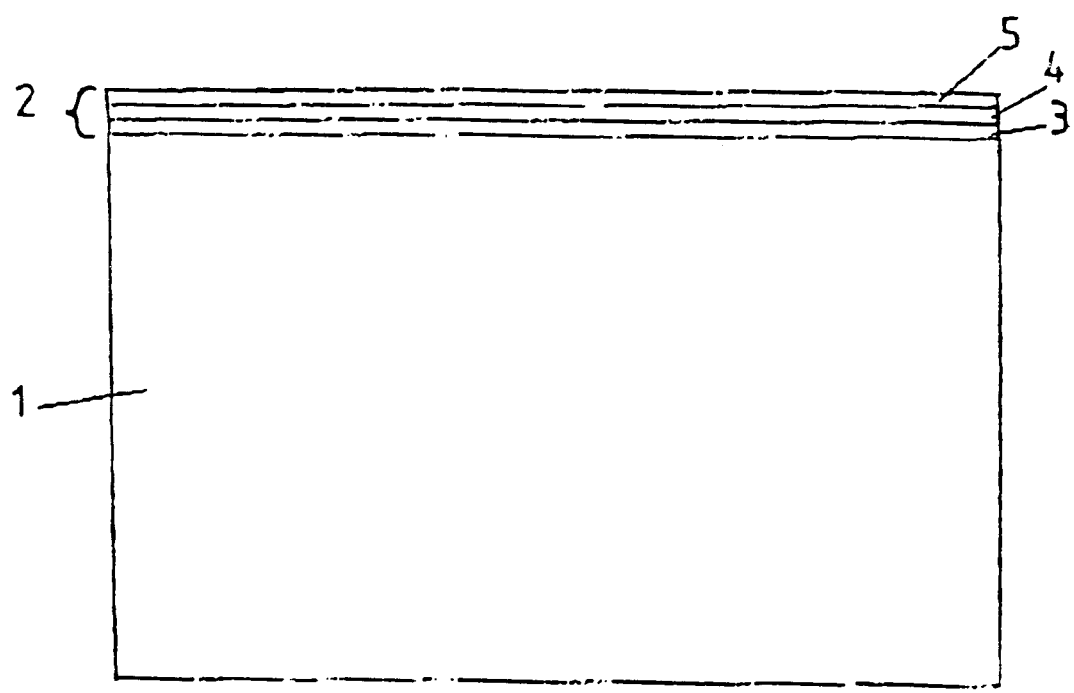

Referring now in detail to the drawing, the FIGURE shows a schematic sectional view of a cushion as defined by the invention. Shown in connection with this cushion are the actual cushion 1 and the textile composite 2 arranged on cushion 1. Textile composite 2 is shown enlarged for the sake of superior clarity. Textile composite 2 has an uppermost layer comprising textile cover 5, to which a polyurethane sheet 4 is bonded. A simple textile fabric 3 is bonded to the backside of polyurethane sheet 4. The entire textile composite 2 is now inserted in a tool and injected from behind with silicone. The polyurethane sheet 4 prevents the silicone from penetrating textile cover 5. However, the silicone penetrates second textile layer 3 and in this way provides for a bond between soft-elastic cushion 1 and textile composite 2. After the silicone has been vulcanized, the projecting excess material is cut off or punched off as required for producing the shape desired for the cushion. In particular, it is possible in this way to manufacture a shoe insert with a textile covering.

Accordingly, while only a single embodiment of the present invention has been shown and described, it is obvious that many changes and modifications may be made thereunto without departing from the spirit and scope of the invention.

What is claimed is:

1. A soft-elastic cushion for use with an orthopedic aid, comprising:
   a cushion element comprising a silicone or multi-component PU elastomer; and
   a textile composite comprising layers comprising a textile cover, a textile fabric layer and a plastic sheet, with the textile cover bonded to one side of the plastic sheet and the textile fabric layer bonded to the other side of the plastic sheet, said textile composite arranged on the cushion element, wherein the silicon or PU elastomer of the cushion element penetrates said textile fabric layer and produces a bond between said textile fabric layer and the cushion element.

2. The cushion according to claim 1, wherein the plastic sheet is a polyurethane sheet.

3. The cushion according to claim 1, wherein the cushion element consists of silicone.

* * * * *